United States Patent
Eom et al.

(10) Patent No.: US 8,943,403 B2
(45) Date of Patent: Jan. 27, 2015

(54) PRINT CONTROL APPARATUS AND PRINTTICKET CONTROL METHOD

(75) Inventors: Yong-in Eom, Hwaseong-si (KR); Young-soo Han, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 1054 days.

(21) Appl. No.: 12/507,931

(22) Filed: Jul. 23, 2009

(65) Prior Publication Data

US 2010/0095200 A1 Apr. 15, 2010

(30) Foreign Application Priority Data

Oct. 13, 2008 (KR) .............................. 2008-100167

(51) Int. Cl.
*G06F 17/00* (2006.01)
*G06F 3/12* (2006.01)

(52) U.S. Cl.
USPC ........... 715/239; 715/234; 715/274; 358/1.15

(58) Field of Classification Search
None
See application file for complete search history.

(56) References Cited

U.S. PATENT DOCUMENTS

| | | | |
|---|---|---|---|
| 7,633,659 B2 | 12/2009 | Uotani et al. | |
| 7,716,570 B2 * | 5/2010 | Adelberg et al. | 715/209 |
| 7,916,332 B2 * | 3/2011 | Kato | 358/1.15 |
| 8,023,135 B2 * | 9/2011 | Levin et al. | 358/1.15 |
| 8,139,276 B2 | 3/2012 | Uotani et al. | |
| 8,213,037 B2 * | 7/2012 | Klave et al. | 358/1.15 |
| 8,339,692 B2 | 12/2012 | Uotani et al. | |
| 8,373,877 B2 | 2/2013 | Lee et al. | |
| 2005/0286100 A1 | 12/2005 | Uotani et al. | |
| 2006/0028667 A1 * | 2/2006 | Saito | 358/1.13 |
| 2007/0136659 A1 * | 6/2007 | Adelberg et al. | 715/513 |
| 2008/0024802 A1 * | 1/2008 | Kato | 358/1.9 |
| 2008/0079962 A1 | 4/2008 | Torikoshi | |
| 2009/0219550 A1 * | 9/2009 | Levin et al. | 358/1.1 |
| 2010/0046048 A1 | 2/2010 | Uotani et al. | |
| 2010/0079778 A1 * | 4/2010 | Kohama | 358/1.9 |
| 2012/0147399 A1 | 6/2012 | Uotani et al. | |

FOREIGN PATENT DOCUMENTS

| | | |
|---|---|---|
| CN | 101118481 | 2/2008 |
| CN | 101256476 | 9/2008 |
| EP | 1892616 | 2/2008 |
| JP | 2005-250606 | 9/2005 |
| JP | 2006-011847 | 1/2006 |

(Continued)

OTHER PUBLICATIONS

European Search Report dated Oct. 9, 2012 issued in EP Patent Application No. 09168139.5.

(Continued)

*Primary Examiner* — Marcus T Riley

(57) ABSTRACT

A print control apparatus includes a determining unit to search for one or more PrintTickets for each level within an XML paper specification (XPS) file in response to an XPS file print command, and to determine whether the one or more PrintTickets found as a result of searching conflict with each other within the XPS file, a user interface, and a controller to control the user interface to display one or more conflicting PrintTickets if it is determined that the one or more PrintTickets conflict with each other within the XPS file. Therefore, it is possible for a user to easily determine which PrintTickets conflict with each other within the XPS file and to readily control these conflicting PrintTickets.

16 Claims, 5 Drawing Sheets

(56) References Cited

FOREIGN PATENT DOCUMENTS

| JP | 2006-042303 | 2/2006 |
|----|-------------|--------|
| JP | 2008-033812 | 2/2008 |
| JP | 2008-140249 | 6/2008 |

OTHER PUBLICATIONS

Office Action issued in Chinese Application No. 200910166724.2 on May 6, 2013.

Office Action issued in Japanese Application No. 2009-235395 on Jul. 2, 2013.

Japanese Office Action dated Apr. 1, 2014 issued in JP Application No. 2009-235395.

Chinese Office Action dated May 22, 2014 issued in CN Application No. 200910166724.2.

Reexamination Report before Trial, dated Oct. 7, 2014, in corresponding Japanese Application No. 2009-235395 (5 pp.).

* cited by examiner

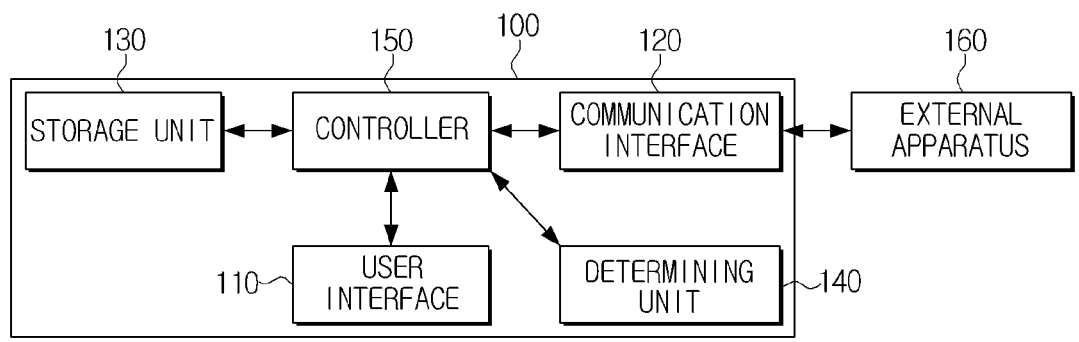

PRINT CONTROL APPARATUS AND PRINTTICKET CONTROL METHOD

CROSS-REFERENCE TO RELATED APPLICATIONS

This application claims priority under 35 U.S.C. §119(a) from Korean Patent Application No. 10-2008-0100167, filed on Oct. 13, 2008, in the Korean Intellectual Property Office, the disclosure of which is incorporated herein by reference in its entirety.

BACKGROUND

1. Field of the General Inventive Concept

The present general inventive concept relates to a print control apparatus and a PrintTicket control method. More particularly, the present general inventive concept relates to a print control apparatus capable of notifying a user that there are conflicting PrintTickets within an Extensible Markup Language (XML) paper specification (XPS) file and easily controlling the conflicting PrintTickets, and to a PrintTicket control method using the same.

2. Description of the Related Art

Image forming apparatuses generally print print data generated by terminal devices, such as computers, onto recording media. Examples of such image forming apparatuses include copiers, printers, facsimile machines or multifunction peripherals (MFPs) which combine functions of copiers, printers and facsimile machines in a single system.

Image forming apparatuses which have been widely used in recent years support a direct printing function of printing document data, such as Portable Document Format (PDF) data, Tagged Image File Format (TIFF) data or Joint Photographic Experts Group (JPEG) format data. Such a direct printing function enables direct printing by merely transmitting a file to an image forming apparatus without the need to launch an additional application program in a terminal device, such as a personal computer (PC), a personal digital assistant (PDA) or a digital camera.

Direct printing functions are applicable to an XML paper specification (XPS) file. XML is a general-purpose specification for creating custom markup languages. An XPS file has a fixed-layout electronic file format that preserves document formatting and can be shared, and is a zip-formatted file which includes all kinds of data and resources described by systematizing all resources required for documents or jobs in a directory structure and by writing the references therebetween in XML. Such an XPS file has a logical structure in the form of a tree having a plurality of levels, as illustrated in FIG. 1.

FIG. 1 illustrates a logical structure of an XPS file.

Referring to FIG. 1, information regarding print options set in an XPS file is defined in PrintTickets within the XPS file. A PrintTicket is an XML-based description of printer settings and configuration information that can be passed as an object to a print driver or stored as a part in an XPS document or file. PrintTickets describe how a document or document part is to printed. The XPS file illustrated in FIG. 1 is represented with a job level, a document level and a page level located in a hierarchical branching structure. The document level includes a plurality of document PrintTickets, and the page level includes a plurality of page PrintTickets. Different print options may be set for each of the plurality of document PrintTickets and for each of the plurality of page PrintTickets. For example, a job-level PrintTicket may be applied to all jobs to correspond to a job level, a document-level PrintTicket may be applied to a corresponding document level and a page level, which is lower than the document level, and a page-level PrintTicket may be applied to only a corresponding page level, which is lower than both the job-level and the document level.

As described above, in the XPS file, different print options may be applied for each PrintTicket, and thus a print option set to an upper-level PrintTicket may conflict with a print option set to a lower-level PrintTicket. However, conventionally when there is a conflict, the lower-level PrintTicket is automatically applied and a user obtains printed documents different from desired printed documents.

Additionally, even when the user determines that there are conflicting PrintTickets within the XPS file in a conventional art, he or she is not provided with information regarding the conflicting PrintTickets, and accordingly, he or she needs to check individually every print option of all PrintTickets and change conflicting print options, which causes inconvenience to users.

SUMMARY

The present general inventive concept provides a print control apparatus capable of notifying a user that there are conflicting PrintTickets within an XML paper specification (XPS) file and a method of easily controlling the conflicting PrintTickets, and to a PrintTicket control method.

Additional aspects and utilities of the present general inventive concept will be set forth in part in the description which follows and, in part, will be obvious from the description, or may be learned by practice of the general inventive concept.

Embodiments of the present general inventive concept may be achieved by providing a print control apparatus including a determining unit to search for one or more PrintTickets for one or more levels within an XML paper specification (XPS) file in response to an XPS file print command, and to determine whether the one or more PrintTickets found as a result of searching conflict with each other within the XPS file; a user interface; and a controller to control the user interface to display one or more conflicting PrintTickets if it is determined that the one or more PrintTickets conflict with each other within the XPS file.

The one or more levels may include at least one of a job level, a document level and a page level. The user interface may display the one or more conflicting PrintTickets that correspond to the one or more levels. The controller may change the one or more conflicting PrintTickets according to a preset option.

The preset option may include at least one of an automatic mode to automatically change conflicting PrintTickets according to the priority level, and a manual mode to enable a user to manually select PrintTickets from among conflicting PrintTickets.

The controller may change PrintTickets in a predetermined set range which conflict with each other in the same manner as the one or more conflicting PrintTickets, to a PrintTicket selected by a user.

The controller may control the XPS file to be printed according to the changed PrintTickets.

The print control apparatus may further include a storage unit to store the changed PrintTickets in the XPS file.

The user interface may display a user interface window, which includes a first area to display the one or more conflicting PrintTicket options within the XPS file and a second area to display levels to correspond to PrintTickets selectable from among the one or more conflicting PrintTickets.

The user interface may preview a print job to be set when at least one PrintTicket is selected from among the selectable PrintTickets.

The print control apparatus may further include a communication interface to transmit an XPS file in which the one or more conflicting PrintTickets are changed.

Embodiments of the present general inventive concept may also be achieved by providing a PrintTicket control method including receiving a command to print an XML paper specification (XPS) file; searching for one or more PrintTickets of different levels within an XML paper specification (XPS) file; determining whether the one or more PrintTickets found as a result of searching conflict with each other within the XPS file; and displaying one or more conflicting PrintTickets if it is determined that the one or more PrintTickets conflict with each other within the XPS file.

The different levels of PrintTickets may include at least one of a job level, a document level and a page level. The displaying of the one or more conflicting PrintTickets may include displaying one or more conflicting PrintTickets for each level. The PrintTicket control method may further include changing the one or more conflicting PrintTickets according to a preset option.

The preset option may include at least one of an automatic mode to automatically change conflicting PrintTickets according to the priority level, and a manual mode to enable a user to manually select PrintTickets from among conflicting PrintTickets.

The changing of the one or more conflicting PrintTickets may include changing PrintTickets in a predetermined set range which conflict with each other in the same manner as the one or more conflicting PrintTickets, to a PrintTicket selected by a user.

The PrintTicket control method may further include printing the XPS file according to the changed PrintTickets.

The PrintTicket control method may further include storing the changed PrintTickets in the XPS file.

The displaying of the one or more conflicting PrintTickets may include displaying a user interface window, which includes a first area to display the one or more conflicting PrintTickets options within the XPS file and a second area to display levels to correspond to PrintTickets selectable from among the one or more conflicting PrintTickets.

The displaying of the user interface window may include previewing a print job to be set when at least one PrintTicket is selected from among the selectable PrintTickets.

Embodiments of the present general inventive concept may also be achieved by providing a system to transmit a changed XPS file including a print control apparatus that changes at least one priority level of conflicting PrintTickets in an XPS file and sends the changed XPS file to an external apparatus and an external apparatus to receive and process the PrintTickets in the at least one changed XPS file.

The external apparatus may include an image forming apparatus. The external apparatus may print a document in accordance with settings of the PrintTickets in the changed XPS file.

Embodiments of the present general inventive concept may also be achieved by providing a method of transmitting a changed XPS file including changing at least one priority level of conflicting PrintTickets in an XPS file and sending the changed XPS file to an external apparatus that receives and processes the changed XPS file.

The external apparatus may include an image forming apparatus. The external apparatus may print a document in accordance with instructions of the PrintTickets in the changed XPS file.

Embodiments of the present general inventive concept may also be achieved by providing a computer readable medium to contain computer-readable codes as a program to perform a PrintTicket control method, the method including receiving a command to print an XML paper specification (XPS) file, searching for one or more levels of PrintTickets of different levels within an XML paper specification (XPS) file, determining whether the one or more PrintTickets found as a result of searching conflict with each other within the XPS file, and displaying one or more conflicting PrintTickets if it is determined that the one or more PrintTickets conflict with each other within the XPS file

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 2 illustrates a block diagram of a print control apparatus according to an exemplary embodiment of the present general inventive concept;

FIGS. 3 to 5 exemplarily illustrates user interface windows to be displayed on the print control apparatus according to an exemplary embodiment of the present general inventive concept.

DETAILED DESCRIPTION OF THE EMBODIMENTS

Figure 1:
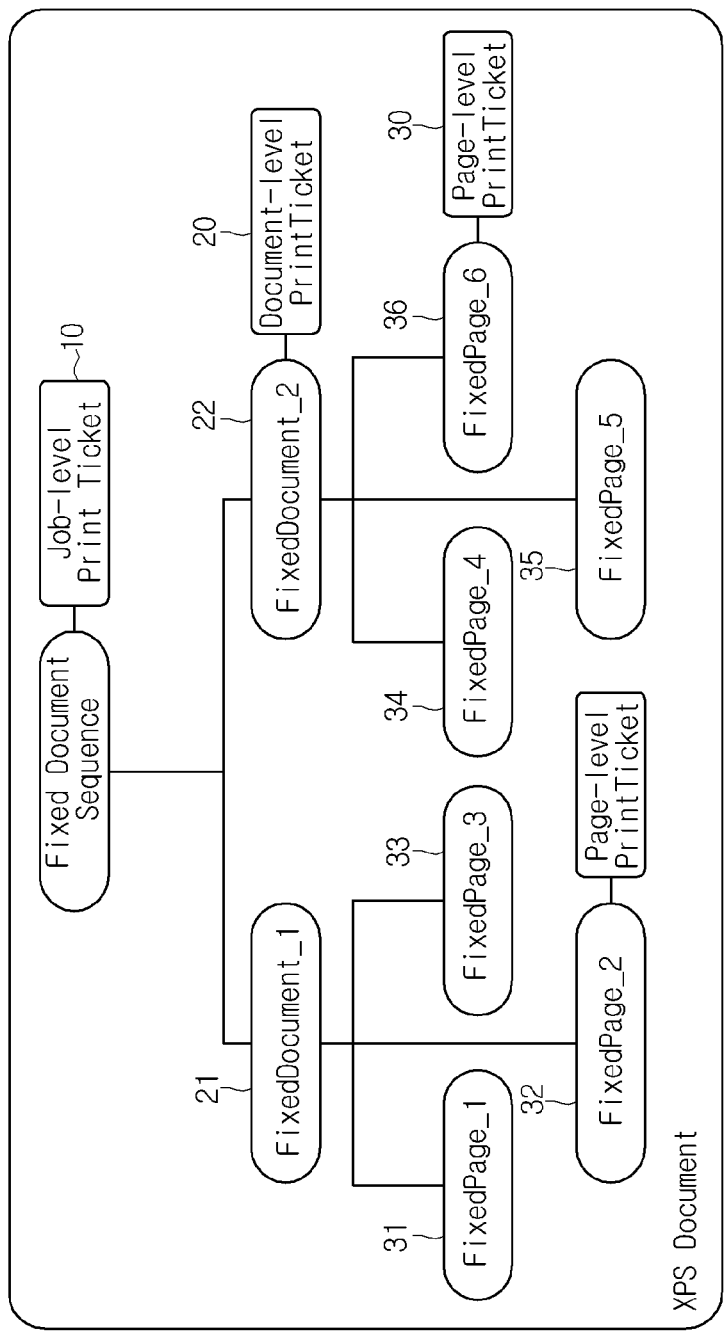
FIG. 1 exemplarily illustrates a logical structure of an XML paper specification (XPS) file.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 2 illustrates a block diagram of a print control apparatus 100 according to an exemplary embodiment of the present general inventive concept. In FIG. 2, the print control apparatus 100 includes a user interface 110, a communication interface 120, a storage unit 130, a determining unit 140 and a controller 150.

The user interface 110 includes a plurality of function keys (not illustrated) through which a user is able to set or select various functions supported by the print control apparatus 100. The user interface 110 displays a variety of information provided by the print control apparatus 100. The user interface 110 may be implemented as an apparatus such as a touch pad, which is able to simultaneously implement input and output, or as an apparatus combining a mouse and a monitor. A user may select an XML paper specification (XPS) file, which he or she desires to print, using a user interface window provided by the user interface 110, and may input a command to print the selected XPS file.

Here, the XPS file, as described above, refers to print data to which print options are set for each PrintTicket, and which is represented in the form of a tree having a plurality of levels. Specifically, the XPS file is configured with a job level, a document level and a page level, each of which has one or more nodes, and may contain PrintTickets in which different print options are set for each level and each node of the tree.

Referring to FIG. 1, the XPS file is represented as having a job level 10, a document level 20 and a page level 30 located in a hierarchical branching structure. The document level 20 may include a plurality of document PrintTickets, and the page level 30 may include a plurality of page PrintTickets. For example, a 'double-sided printing' option may be set to the job-level PrintTicket 10; a 'two pages per sheet (2-up)' option may be set to a first document PrintTicket 21 of the document level 20; an 'A4 paper' option may be set to a first page PrintTicket 31 of the first document 21; and an 'A5 paper' option may be set to a second page PrintTicket 32 of the first document 21. In this situation, the PrintTickets set to the respective nodes of the tree are available at lower levels.

The communication interface 120 connects the print control apparatus 100 to an external apparatus 160. The communication interface 120 may access the external apparatus 160 via a local area network (LAN) and Internet network, or using a parallel port, a universal serial bus (USB) port and a wireless module. For example, if the print control apparatus 100 is a terminal device such as a personal computer (PC), a laptop computer, a personal digital assistant (PDA) or a digital camera, the communication interface 120 may be connected to an external apparatus that is an image forming apparatus such as a printer, copier, facsimile or MFP and may send to the image forming apparatus a changed XPS file in which conflicting PrintTickets are changed by operations that will be described later. The external apparatus 160 may store, print, or further transmit the changed XPS file after receiving the changed XPS file. When printing, the external apparatus 160 may print one or a plurality of sheets or documents according to the settings and/or instructions of the PrintTickets included in the changed XPS file. Alternatively, if the print control apparatus 100 is an image forming apparatus, such as a printer or a multifunction peripheral (MFP), the communication interface 120 may be connected to an external apparatus 160 that is a terminal device. The print control apparatus 100 may receive an XPS file and a command to print the XPS file, and may transmit to the terminal device a changed XPS file in which conflicting PrintTickets are changed by operations that will be described later.

The storage unit 130 may store an XPS file. The storage unit 130 also stores a changed XPS file in which conflicting PrintTickets are changed by operations that will be described later. Additionally, the storage unit 130 may be implemented as a storage medium mounted in the print control apparatus 100 and an external storage medium, for example a removable disk including a USB memory, a storage medium connected to a host device or a web server on a network.

If an XPS file print command is received, the determining unit 140 searches for PrintTickets for each level within an XPS file, and determines whether one or more PrintTickets found as a result of searching conflict with each other within the XPS file. In more detail, if a user enters a print command using the user interface 110 or if an XPS file is received via the communication interface 120, the determining unit 140 may search for PrintTickets for each level within the XPS file to which the print command is applied, may compare an upper-level PrintTicket to a lower-level PrintTicket among one or more PrintTickets found as a result of searching, and may determine whether the upper-level PrintTicket conflicts with the lower-level PrintTicket within the XPS file.

For example, if an 'A4 paper' option is set to a job-level PrintTicket within an XPS file, an 'A3 paper' option is set to a document-level PrintTicket lower than the job-level PrintTicket, and an 'A5 paper' option is set to a page-level PrintTicket lower than the document-level PrintTicket, the determining unit 140 may determine that the job-level PrintTicket, document-level PrintTicket and page-level PrintTicket conflict with each other. This is because only a single paper size option is applicable to a single page, and accordingly it is impossible to concurrently apply the 'A4 paper', 'A3 paper' and 'A5 paper' options to the job-level PrintTicket, document-level PrintTicket and page-level PrintTicket, respectively. Additionally, the determining unit 140 may search for PrintTickets within the XPS file using a 'GetPrintTicket' application program interface (API) of an XPS printer driver, and determine whether there are conflicting PrintTickets within the XPS file.

The controller 150 controls the determining unit 140 to search for PrintTickets for each level within the XPS file when the XPS file print command is received. For example, if the print control apparatus 100 is a terminal device, such as a PC, the controller 150 may control the determining unit 140 to search for PrintTickets for each level within the XPS file, in response to the user print command received via the user interface 110. Additionally, assuming that the print control apparatus 100 is an image forming apparatus, if an XPS file is received via the communication interface 120 or if a command to print an XPS file pre-stored in the storage unit 130 is received from a terminal device via the communication interface 120, or if a user command to print an XPS file pre-stored in the storage unit 130 is received directly via the user interface 110, the controller 150 may control the determining unit 140 to search for PrintTickets for each level within the XPS file.

When it is determined that PrintTickets conflict with each other within the XPS file, the controller 150 may control the user interface 110 to display the conflicting PrintTickets. In more detail, the controller 150 may receive from the determining unit 140 information regarding whether there are conflicting PrintTickets, a list of conflicting PrintTickets and print options defined in conflicting PrintTickets, and displays the received information using the user interface 110. In this situation, the controller 150 may control the user interface 110 to generate a user interface window, which may include a first area to display PrintTickets conflicting within the XPS file and a second area to display levels to correspond to conflicting PrintTickets so that a user can select desired PrintTickets of the user. The user interface window may further include a third area to display a box through which a user can decide whether to change PrintTickets that will conflict with each other in the same manner as currently conflicting PrintTickets to a currently selected PrintTicket. The user interface window will be further described later.

Accordingly, it is possible for a user to easily know whether a currently open XPS file contains PrintTickets which conflict with each other.

Additionally, the controller 150 may change conflicting PrintTickets according to a preset option. In more detail, the controller 150 may change conflicting PrintTickets using an automatic mode to automatically change conflicting PrintTickets according to the priority level, or using a manual mode to enable a user to manually select PrintTickets from among conflicting PrintTickets. The automatic mode may be set to change a print option of a PrintTicket with a lower priority to a print option of a PrintTicket with an upper priority among conflicting PrintTickets, according to the preset priority (for example, page level>document level>job level).

That is, a PrintTicket with a lower priority such as page level, may be elevated in priority to print before either or both of the document level or job level PrintTickets. Or, the automatic mode may be set to prefer the middle document level to either of the other levels, or other relationships between priority levels of PrintTickets may be set. Also, if PrintTickets with the same level are found in an XPS file, then an automatic mode may be set to favor one type of print option over the other, or a user may select a desired print option via the manual mode.

The manual mode may be set to change conflicting PrintTickets according to user selection. Specifically, the manual mode may enable a print option set to a PrintTicket that is not selected by the user to be changed to a print option set to a PrintTicket selected by the user. For example, when an 'A3 paper' option and an 'A4 paper' option are set to a document-level PrintTicket and a page-level PrintTicket in an XPS file, respectively, if a user selects the document-level PrintTicket, the 'A4 paper' option set to the page-level PrintTicket may be changed to the 'A3 paper' option set to the document-level PrintTicket using the manual mode. Alternatively, if the user selects the page-level PrintTicket, the 'A3 paper' option may be changed to the 'A4 paper' option using the manual mode. In the manual mode, a user can change conflicting PrintTickets to a selected PrintTicket using an XPS parser of an XPS driver.

Additionally, the controller 150 may apply the PrintTicket selected by the user in a currently set range to another set range in which PrintTickets conflict with each other in the same manner as those in the currently set range, so as to change all the PrintTickets conflicting in the other set range to the PrintTicket selected by the user. In more detail, the XPS file has a job level, a document level and a page level located in a hierarchical branching structure, so PrintTickets conflicting in the same way may exist within different set ranges. For example, if a user selects a PrintTicket within a currently set range, the controller 150 may change all print options of PrintTickets conflicting within other set ranges to the selected PrintTicket. In this situation, prior to changing these print options, the controller 150 may receive a user's response to determine whether to change all the print options using the user interface 110. Additionally, conflicting PrintTickets may be changed individually according to the set range.

If a user selects at least one from among conflicting PrintTickets, the controller 150 may control the user interface 110 to preview the print job set according to the user selection. For example, if a user selects one of a plurality of selectable PrintTickets, the user interface 110 may display a print job, to which the selected PrintTicket is to be applied, on one side of a user interface window, in order to inform the user of the print job prior to printing.

The controller 150 may control a changed XPS file, in which conflicting PrintTickets are changed either automatically or manually as described above, to be printed. For example, if the print control apparatus 100 is a terminal device, such as a PC, the controller 150 may transmit the changed XPS file via the communication interface 120, so that the changed XPS file may be printed. Alternatively, if the print control apparatus 100 is an image forming apparatus, the controller 150 may control a print engine (not illustrated) to print the changed XPS file.

Additionally, the controller 150 may store the changed XPS file in the storage unit 130, in order to repeatedly print the changed XPS file. In this situation, the controller 150 may store the changed XPS file with a different name, or store the changed XPS file by overriding the original XPS file. Such a storing operation may be performed according to user selection or automatically performed without any user command. In this situation, if the print control apparatus 100 is an image forming apparatus, or if the storage unit 130 is an external storage medium outside the print control apparatus 100, the controller 150 may transmit the changed XPS file to a terminal device or a web server so that the changed XPS file may be stored in a storage unit (not illustrated) inside the terminal device or in a web server.

The determining unit 140 and the controller 150 may also be implemented as filter modules within a filter pipeline pass of an XPS printer driver.

Therefore, according to the present general inventive concept, it is possible for a user to easily determine which PrintTickets currently conflict within an XPS file, and readily change conflicting PrintTickets using a user interface window.

FIG. 3 exemplarily illustrates a user interface window 300 to be displayed on the print control apparatus 100.

In FIG. 3, the user interface window 300 displays PrintTickets which conflict within an XPS file. In more detail, in the XPS file, PrintTickets set to a job level, a document level and a page level may differ from each other, and thus these PrintTickets may conflict. Accordingly, in order to enable a user to select one from among the conflicting PrintTickets, the user interface window 300 may display a list of PrintTickets conflicting within a currently open XPS file.

Print options illustrated in FIG. 3 are described briefly below. A '4-up' option refers to a print option to print four pages on one sheet of paper; a '2-up' option refers to a print option to print two pages on one sheet of paper. A 'grayscale' option refers to a print option to print in black and white only, and a 'color' option refers to a print option to print in color.

Other print options may be used, for instance, a 'fontsize10' option refers to a print option to print letters or numbers of a given document in a particular font size and may be used with suffixes of 08, 09, 10, 11, 12, etc. to designate a given font size. A 'fontstyleAria' option refers to a print option to print letters or numbers of a given document in a particular font style such as Arial, TimesNewRoman, etc. Also, a 'linespace1' option refers to a print option to print lines of text in a given document to be spaced from each other in a spaced manner such as single spaced, double spaced, one-and-a half spaced, etc. Other print options may be used as are known in the art.

In this situation, it is impossible to concurrently apply the '2-up' option and '4-up' option to a single sheet of paper, and also impossible to concurrently apply the 'grayscale' option and 'color' option to a single sheet of paper. It would also be impossible to apply a 'fontsize08' concurrently with a 'fontsize10' to a single sheet of paper, or to apply a 'fontstyleArial' to a 'fontstlyeTimes' to a single sheet of paper, and it would be impossible to apply a 'linespace01' and a 'linespace02' option, and so on with other print options.

In other words, a PrintTicket to which the '2-up' option is set conflicts with a PrintTicket to which the '4-up' option is set, and a PrintTicket to which the 'grayscale' option is set conflicts with a PrintTicket to which the 'color' option is set. A PrintTicket to which the 'fontsize08' option is set conflicts with a PrintTicket to which the 'fontsize10' option is set, a PrintTicket to which the 'fontstyleArial' option is set conflicts with a PrintTicket to which the 'fontstyleTimes' option is set, and PrintTicket to which the 'linespace01' option is set conflicts with a PrintTicket to which the 'linespace02' option is set, and so on with other print options.

As described above, the user interface window 300 may display the list of conflicting PrintTickets within the XPS file, and therefore it is possible for a user to easily obtain information regarding conflicting PrintTicket instructions or settings among PrintTickets within the XPS file.

Figure 4:
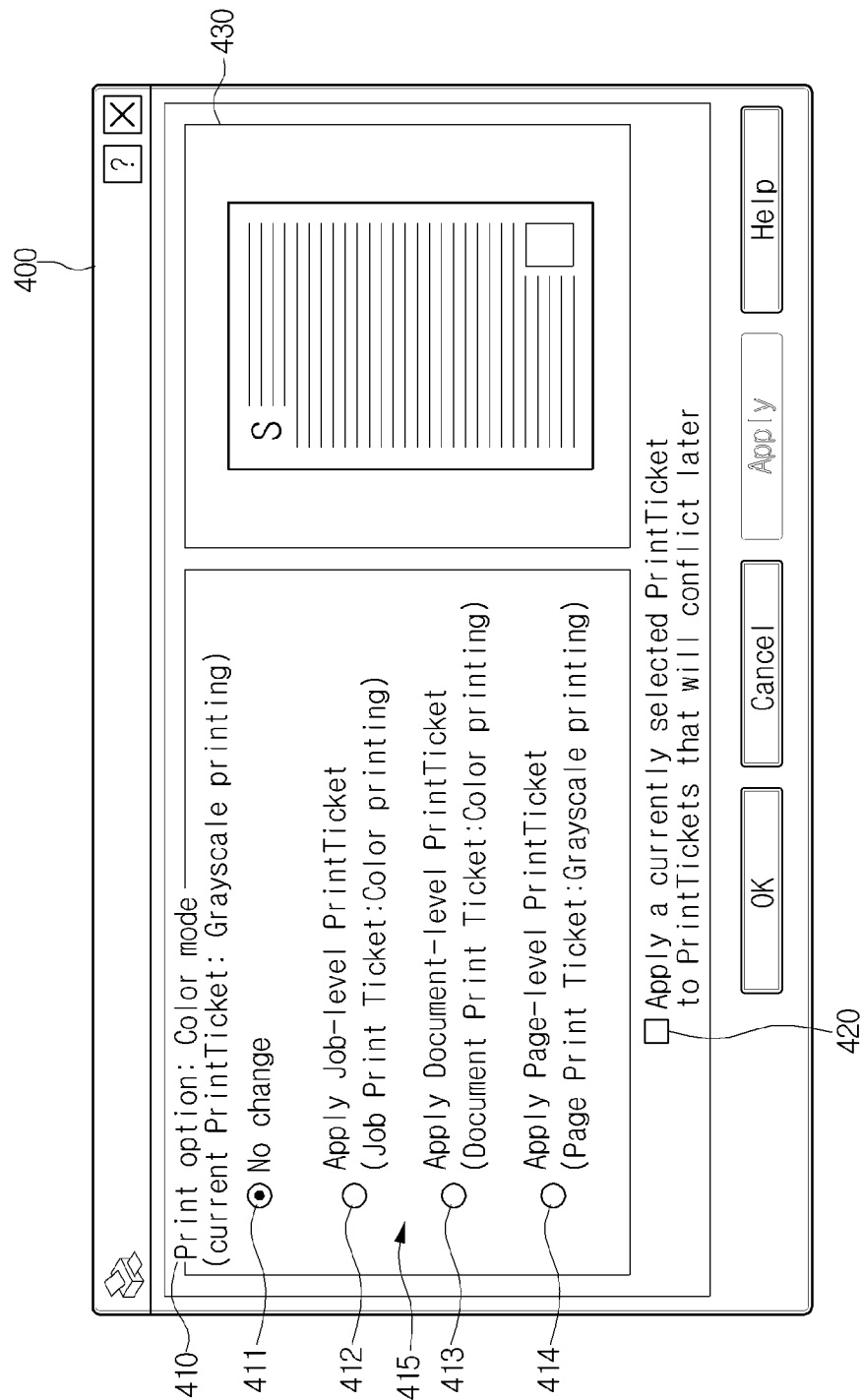
Figure 5:
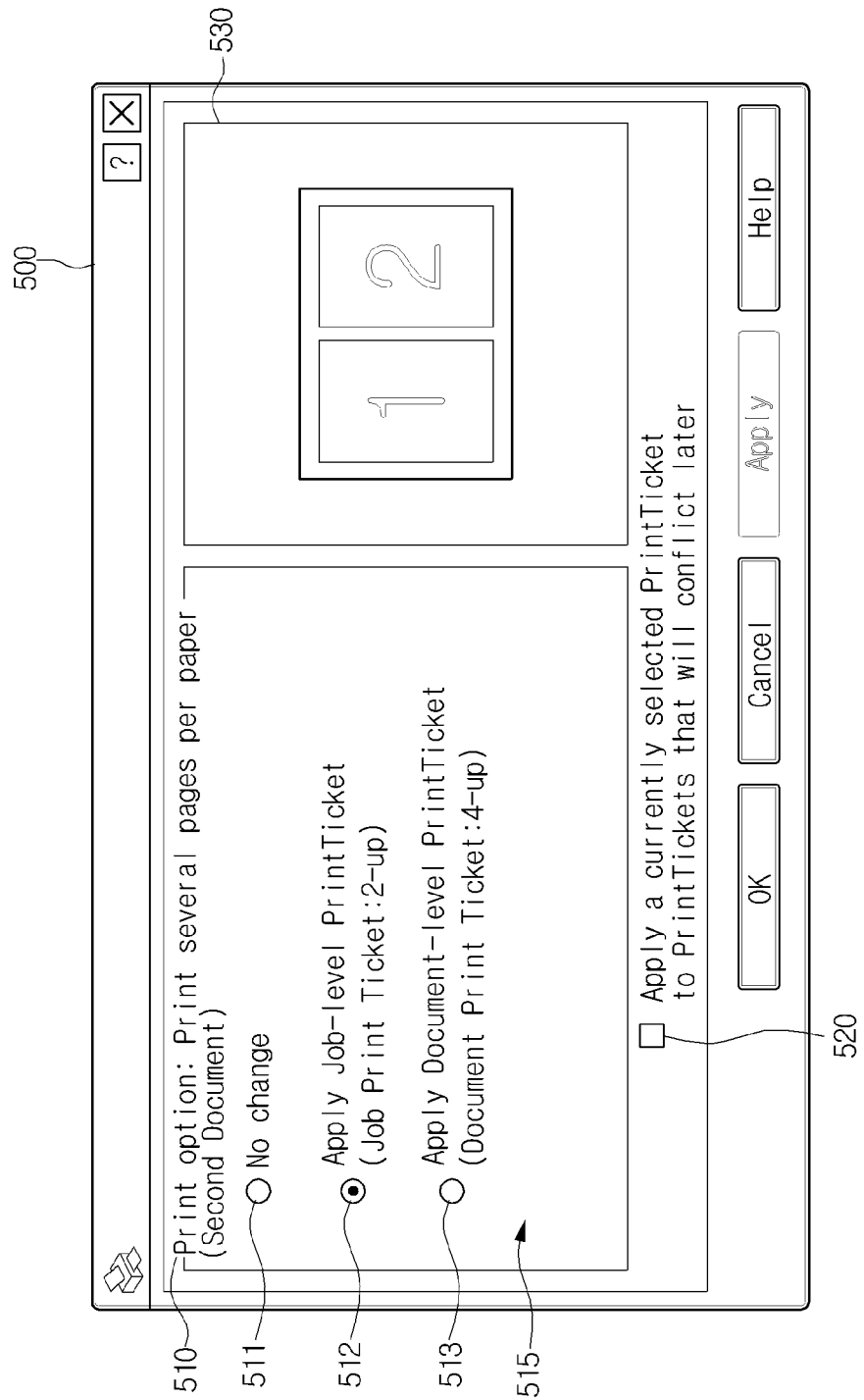

FIGS. 4 and 5 exemplarily illustrate user interface windows 400 and 500 to be displayed on the print control apparatus 100.

In FIG. 4, the user interface window 400 includes a first area 410 to display the conflicting type of PrintTicket options among PrintTickets within a currently open XPS file, and a second area to display levels to correspond to PrintTickets selectable from conflicting PrintTickets. In more detail, the 'grayscale' option is set to a page-level PrintTicket of a currently open XPS file, and the 'color' option is set to a document-level PrintTicket and job-level PrintTicket, so it is impossible to simultaneously apply the 'grayscale' option and 'color' option during printing on a single sheet of paper. Accordingly, the second area 415 of the user interface window 400 displays the page-level PrintTicket and the document-level PrintTicket and job-level PrintTicket, as conflicting PrintTickets.

The second area 415 includes four options 411, 412, 413 and 414 to provide a user with print options previously set to each level and PrintTickets which the user can select. In more detail, options 412, 413 and 414 set to the currently conflicting PrintTickets, namely the job-level, document-level and page-level PrintTickets, are displayed, so the user can select a desired PrintTicket among the conflicting PrintTickets. Therefore, it is possible for the user to easily change conflicting PrintTickets to desired PrintTicket settings or instructions.

Additionally, the user interface window 400 includes a box 420 through which a user can decide whether to apply a currently selected PrintTicket to PrintTickets that will conflict later. As described above, PrintTickets conflicting in the same way may exist within different set ranges, so it is possible to receive user choice of whether to apply a PrintTicket selected from a currently set range to another set range in which PrintTickets conflict with each other in the same manner as those in the currently set range.

The user interface window 400 further includes a preview area 430 to preview a print job to be set when a user selects at least one PrintTicket from among conflicting PrintTickets in the second area 415. For example, if a user selects one from among a plurality of PrintTickets displayed, the preview area 430 may preview a print job to which the selected PrintTicket is to be set, in order to inform the user of a print form prior to printing.

Referring to FIG. 5, if the '2-up' option is set to a job-level PrintTicket of a currently open XPS file, but the '4-up' option is set to a document-level PrintTicket, the job-level PrintTicket may conflict with the document-level PrintTicket, because it is impossible to apply the '2-up' option and '4-up' option at the same time. As described above with reference to FIG. 4, the user interface window 500 includes a first area 510 to display conflicting PrintTickets among PrintTickets within a currently open XPS file, and a second area 515 to display levels to correspond to PrintTickets selectable from among conflicting PrintTickets. The second area includes three options 511, 512 and 513 through which a user is able to select PrintTickets set to each level. The user interface window 500 also includes a box 520 through which a user can decide whether to apply a currently selected PrintTicket to PrintTickets that will conflict later, and a preview area 530 to preview a print job to be set when a user selects at least one PrintTicket from among conflicting PrintTickets prior to printing. Accordingly, it is possible for a user to select one of a plurality of PrintTickets displayed, and thus to easily change conflicting PrintTickets to the selected PrintTicket.

Figure 6:
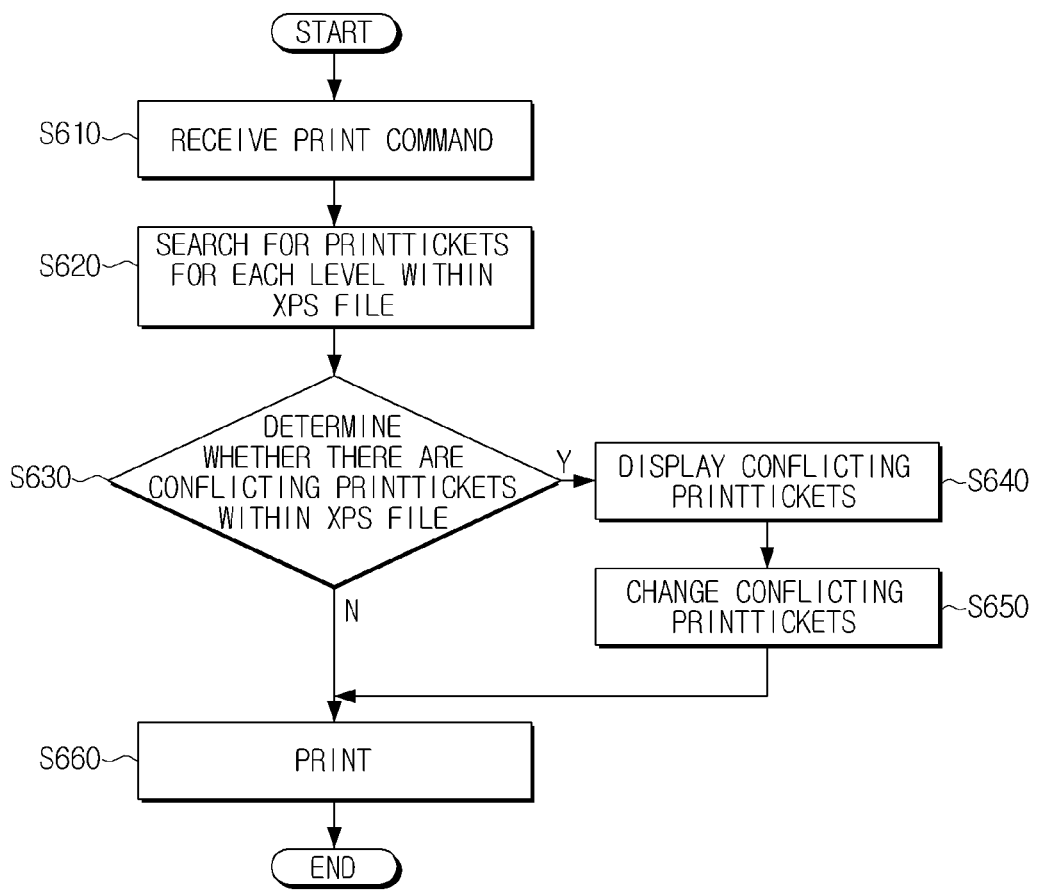
FIG. 6 is a flowchart illustrating a PrintTicket control method according to an exemplary embodiment of the present general inventive concept.

FIG. 6 is a flowchart illustrating a PrintTicket control method according to an exemplary embodiment of the present general inventive concept.

In FIG. 6, if an XPS file print command is received in operation S610, PrintTickets are searched for within an XPS file in operation S620. More specifically, PrintTickets may be searched for within an XPS file using a 'GetPrintTicket' API of an XPS printer driver, or alternatively the XPS file may be unpackaged so that PrintTickets in the unpackaged XPS file may be searched for.

Additionally, whether one or more PrintTickets found as a result of searching conflict with each other within the XPS file is determined in operation S630. If found, the one or more PrintTickets are compared to determine whether the levels of upper-level PrintTickets such as job-level, medium-level PrintTickets such as document-level, and lower-level PrintTickets such as page-level, conflict with each other.

For example, if an 'A4 paper' option is set to a job-level PrintTicket within an XPS file, an 'A3 paper' option is set to a document-level PrintTicket lower than the job-level PrintTicket, and an 'A5 paper' option is set to a page-level PrintTicket lower than the document-level PrintTicket, it is determined that the job-level PrintTicket, document-level PrintTicket and page-level PrintTicket conflict with each other. This is because only a single paper size option is applicable to a single page, and accordingly it is impossible to concurrently apply the 'A4 paper', 'A3 paper' and 'A5 paper' options to the job-level PrintTicket, document-level PrintTicket and page-level PrintTicket, respectively.

As a result, if it is determined that no PrintTickets conflict within the XPS file, the XPS file is printed in operation S660. For example, if the PrintTicket control method of FIG. 6 according to the exemplary embodiment of the present general inventive concept is employed by a terminal device such as a PC, the terminal device may send the XPS file to an image forming apparatus; and alternatively, if the PrintTicket control method of FIG. 6 is employed by an image forming apparatus such as an MFP, the XPS file may be printed directly by a print engine of the image forming apparatus.

On the other hand, if it is determined that the XPS file contains conflicting PrintTickets, these conflicting PrintTickets are displayed in operation S640. More specifically, information regarding whether there are conflicting PrintTickets, a list of conflicting PrintTickets and print options defined in conflicting PrintTickets may be displayed so that a user can be provided with the information. The operation of displaying conflicting PrintTickets is performed in the same manner as described above with reference to FIGS. 3 to 5.

Therefore, it is possible for a user to easily know whether a currently open XPS file contains conflicting PrintTickets.

Conflicting PrintTickets within the XPS file may be changed according to a preset option in operation S650. In more detail, these conflicting PrintTickets may be changed using an automatic mode to automatically change conflicting PrintTickets, or using the manual mode to enable a user to manually select PrintTickets from among conflicting PrintTickets. Here, the automatic mode may be set to change a print option of a PrintTicket with a lower priority to a print option of a PrintTicket with an upper priority among conflicting PrintTickets, according to a preset priority (for example, page level >document level >job level), other preset priority relationships, or based on other print options as described herein.

The manual mode may be set to change conflicting PrintTickets according to user selection. Specifically, the manual mode enables a print option set to a PrintTicket other than a PrintTicket selected by the user to be changed to a print option set to the PrintTicket selected by the user. In the manual mode, the PrintTicket selected by the user in a currently set range may be applied to another set range in which PrintTickets conflict with each other in the same manner as those in the currently set range, so that all the PrintTickets conflicting in the other set range can be changed to the PrintTicket selected by the user. Additionally, if a user selects at least one of conflicting PrintTickets in the manual mode, a print job set according to user selection may be displayed as a preview image.

If conflicting PrintTickets are changed within an XPS file, a changed XPS file is printed in operation S660. For example, if the PrintTicket control method of FIG. 6 is employed by a terminal device such as a PC, the terminal device may send the changed XPS file to external apparatus such as an image forming apparatus so that the changed XPS file may be printed. Alternatively, if the PrintTicket control method of FIG. 6 is employed by an image forming apparatus, the changed XPS file may be printed directly by a print engine of the image forming apparatus. Additionally, the changed XPS file may be stored according to a user storage command, or stored automatically.

The PrintTicket control methods of the present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Therefore, it is possible for the user to easily know whether there are conflicting PrintTickets within an XPS file which he or she desires to print, and to readily change these conflicting PrintTickets. The PrintTicket control method of FIG. 6 may be performed by a print control apparatus configured as illustrated in FIG. 2 or other apparatuses.

Although a few embodiments of the present general inventive concept have been illustrated and described, it will be appreciated by those skilled in the art that changes may be made in these embodiments without departing from the principles and spirit of the present general inventive concept.

What is claimed is:

1. A print control apparatus comprising:
a determining unit to search for two or more PrintTickets for two or more levels within an XML paper specification (XPS) file in response to an XPS file print command to perform a print operation, the two or more levels of PrintTickets comprising at least two of a job level, a document level and a page level, and to determine whether the two or more PrintTickets found as a result of searching conflict with each other within the XPS file;
a user interface; and
a controller to control the user interface to display two or more conflicting PrintTickets if it is determined that the two or more PrintTickets conflict with each other within the XPS file
wherein the user interface displays a user interface window, which comprises a first area to display the two or more conflicting PrintTicket options within the XPS file and a second area to display user-selectable levels corresponding to PrintTickets from among the two or more conflicting PrintTickets, and previews a print job to be set when at least one of the user-selectable levels of the PrintTickets is selected from among the user selectable levels of the PrintTickets.

2. The print control apparatus of claim 1, wherein the one or more levels comprise at least one of a job level, a document level and a page level.

3. The print control apparatus of claim 1, wherein the user interface displays the two or more conflicting PrintTickets that correspond to the two or more levels.

4. The print control apparatus of claim 1, wherein the controller changes the two or more conflicting PrintTickets according to a preset option.

5. The print control apparatus of claim 4, wherein the preset option comprises at least one of an automatic mode to automatically change conflicting PrintTickets according to the priority level, and a manual mode to enable a user to manually select PrintTickets from among conflicting PrintTickets.

6. The print control apparatus of claim 5, wherein the controller changes PrintTickets in a predetermined set range which conflict with each other in the same manner as the two or more conflicting PrintTickets, to a PrintTicket selected by a user.

7. The print control apparatus of claim 4, wherein the controller controls the XPS file to be printed according to the changed PrintTickets.

8. The print control apparatus of claim 4, further comprising:
a storage unit to store the changed PrintTicket in the XPS file.

9. The print control apparatus of claim 4, further comprising:
a communication interface to transmit an XPS file in which the two or more conflicting PrintTickets are changed.

10. A PrintTicket control method comprising:
receiving a command to print an XML paper specification (XPS) file in a print operation;
searching for two or more levels of PrintTickets of different levels within the XPS file, the different levels of PrintTickets comprising at least two of a job level, a document level and a page level in response to the command;
determining whether the two or more PrintTickets found as a result of searching conflict with each other within the XPS file; and
displaying conflicting levels of PrintTickets if it is determined that the two or more levels of PrintTickets conflict with each other within the XPS file
wherein the displaying of the two or more conflicting Print Tickets comprises a user interface window, which comprises a first area to display the two or more conflicting PrintTickets options within the XPS file and a second area to display levels corresponding to PrintTickets selectable from among the two or more conflicting levels of PrintTickets and previewing a print job to be set when at least one level of PrintTicket is selected from among the selectable different levels of PrintTickets.

11. The PrintTicket control method of claim 10, wherein the displaying of the two or more conflicting PrintTickets comprises displaying two or more conflicting PrintTickets for each level.

12. The PrintTicket control method of claim 10, further comprising:
changing the two or more conflicting PrintTickets according to a preset option.

13. The PrintTicket control method of claim 12, wherein the preset option comprises at least one of an automatic mode to automatically change conflicting PrintTickets according to the priority level, and a manual mode to enable a user to manually select PrintTickets from among conflicting PrintTickets.

14. The PrintTicket control method of claim 13, wherein the changing of the two or more conflicting PrintTickets comprises changing PrintTickets in a predetermined set range which conflict with each other in the same manner as the two or more conflicting PrintTickets, to a PrintTicket selected by a user.

15. The PrintTicket control method of claim 12, further comprising:
   printing the XPS file according to the changed PrintTickets.

16. The PrintTicket control method of claim 12, further comprising:
   storing the changed PrintTickets in the XPS file.

* * * * *

UNITED STATES PATENT AND TRADEMARK OFFICE
CERTIFICATE OF CORRECTION

PATENT NO. : 8,943,403 B2  
APPLICATION NO. : 12/507931  
DATED : January 27, 2015  
INVENTOR(S) : Yong-in Eom Page 1 of 1

It is certified that error appears in the above-identified patent and that said Letters Patent is hereby corrected as shown below:

Claims

Claim 2, Column 12, Line 7-8 (Approximately)

Delete "one or more" and insert --two or more--, therefor.

Claim 2, Column 12, Line 8 (Approximately)

Delete "one" and insert --two--, therefor.

Signed and Sealed this
Thirteenth Day of October, 2015

Michelle K. Lee
*Director of the United States Patent and Trademark Office*